No. 639,708. Patented Dec. 26, 1899.
J. M. CERTAIN.
PARCEL CARRIER FOR BICYCLES.
(Application filed Apr. 29, 1899.)
(No Model.)
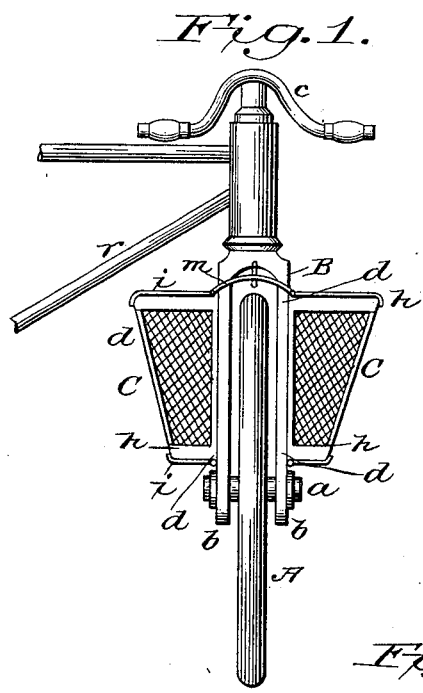
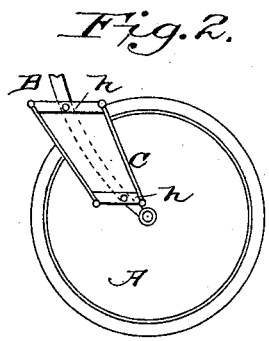
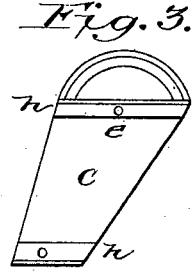
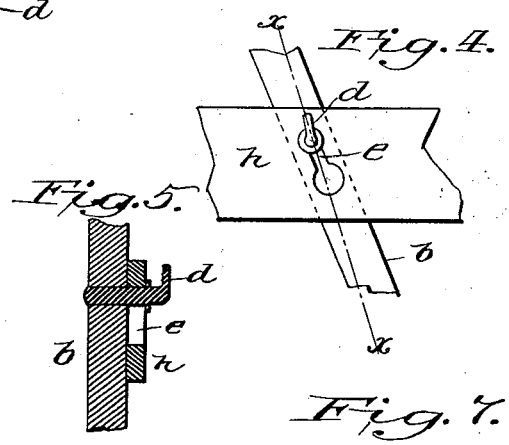
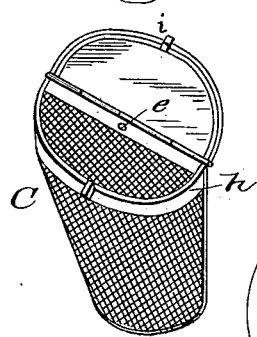
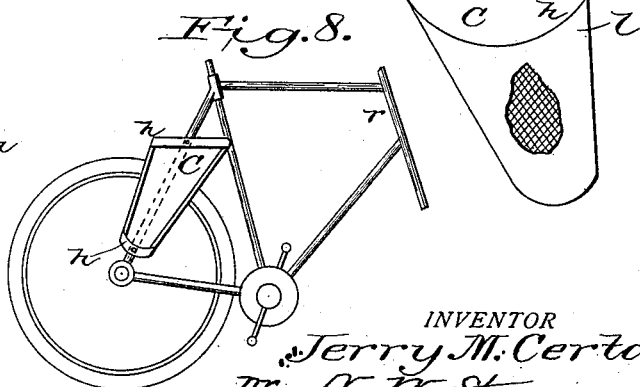
WITNESSES
INVENTOR
Jerry M. Certain,
pr N. W. Stearns.
Attorney.

UNITED STATES PATENT OFFICE.

JERRY M. CERTAIN, OF TAMPA, FLORIDA, ASSIGNOR OF ONE-HALF TO ANTONIO TOFFALETI, OF SAME PLACE.

PARCEL-CARRIER FOR BICYCLES.

SPECIFICATION forming part of Letters Patent No. 639,708, dated December 26, 1899.

Application filed April 29, 1899. Serial No. 715,046. (No model.)

*To all whom it may concern:*

Be it known that I, JERRY M. CERTAIN, of Tampa, Hillsborough county, Florida, have invented certain Improvements in Bicycle Parcel-Carriers, of which the following is a full, clear, and exact description, reference being had to the accompanying drawings, making part of this specification, in which—

Figure 1 is an end elevation of the front of a pilot-wheel of a bicycle having applied thereto a pair of baskets for carrying parcels constructed in accordance with my invention. Fig. 2 represents one of my parcel-carrying baskets attached to one side of the forked bar to and within which the guide-wheel is pivoted. Fig. 3 is an elevation of the back of one of the baskets. Fig. 4 represents (full size) a portion of the frame at the top of a basket with its aperture for receiving the stud projecting from the outside of one of the forked bars. Fig. 5 is a section on the line $x\ x$ of Fig. 4, showing one of the bifurcations of the forked bar with its fastening-stud projecting therefrom and entering the aperture in the frame of the top of the basket. Fig. 6 represents the top of a basket, with its hinged lid. Fig. 7 shows a covering for excluding the dust and weather from the basket when of open-work construction. Fig. 8 shows the application of my invention to the forked bar of the rear wheel.

This invention relates exclusively to that class of bicycle attachments known in the art as "parcel-carriers;" and my present invention consists in the combination, with one of its forked (wheel) bars, of a pair of symmetrically-formed basket-receptacles, located on opposite sides of said bar, and a means of attaching and detaching the same, the details of the construction of said receptacles being hereinafter described and claimed.

In the said drawings, A represents the front or pilot wheel of a bicycle, pivoted at $a$ to and within the bifurcations $b\ b$ of the forked steering-bar B, to the top of which is secured the handle $c$. C C are a pair of baskets of similar form and construction, and supported on opposite sides of the said bar by means of hooks $d\ d$, projecting out therefrom and entering apertures $e\ e$ in the top and bottom hoop-iron stays $h$, which constitute the rims and frame of the baskets. (See Figs. 3, 4, and 5.) The top and the bottom of each basket is substantially of semi-oval form, flat at its back, the bottom smaller than the top, and each provided with a hinged lid $i$. When the baskets are of open-work construction—for instance, of woven wire or braided ratan—each is provided with an outer covering $l$ to exclude sand, dust, rain, &c., from its interior, Fig. 7, and both baskets may be connected in front by a band $m$, extending over the wheel (see Fig. 1) or at the back when applied to the rear wheel. Straps $n$ for removing and carrying both baskets together may be provided. (See Fig. 7.) In supporting the pair of baskets from the front bar B care must be had that their tops be located sufficiently low to avoid their coming into contact with the stationary inclined brace $r$ when the pilot-wheel changes its direction.

I claim—

In a bicycle parcel-carrier, and in combination, hooks secured upon the forked steering-bars, and oppositely-located and symmetrically-formed basket-receptacles having apertures for receiving said hooks.

Witness my hand this 1st day of March, 1899.

JERRY M. CERTAIN.

In presence of—
 HARRY A. PEEPLES,
 C. W. STEVENS.